April 5, 1960
A. ZITTRELL ET AL
2,931,474
ENGAGABLE TOOTH CLUTCH, ESPECIALLY FOR
CHANGE GEAR TRANSMISSIONS
Filed March 22, 1957
Fig. 1
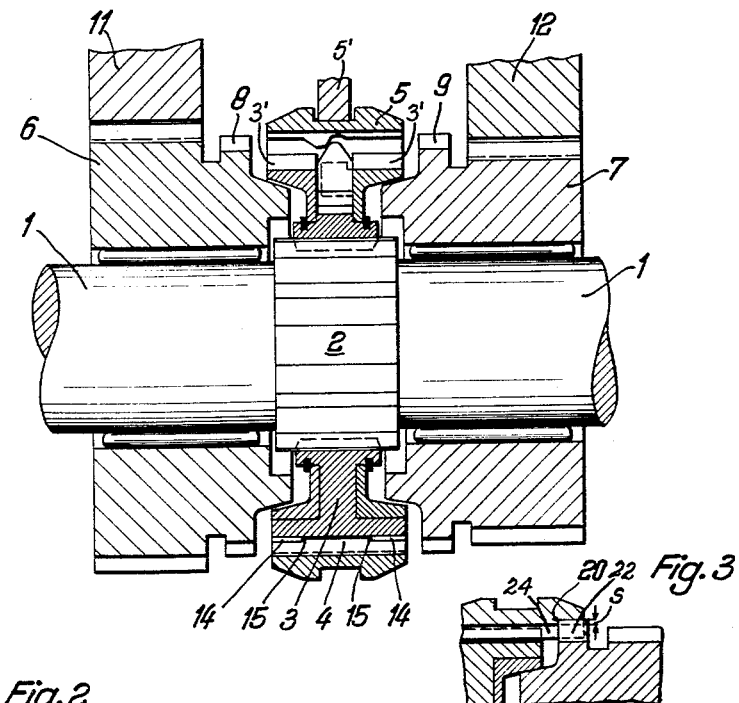
Fig. 3
Fig. 2
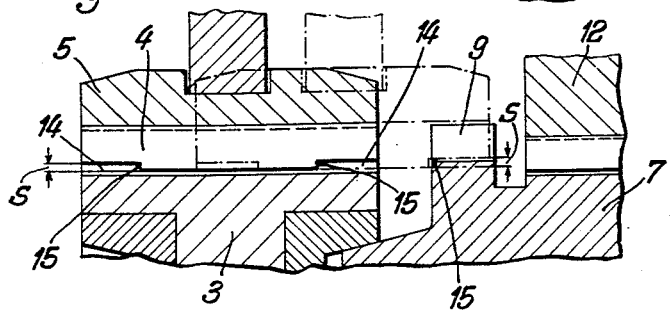
Inventors,
ANTON ZITTRELL,
GEORG WIMMER

United States Patent Office 2,931,474
Patented Apr. 5, 1960

2,931,474

ENGAGEABLE TOOTH CLUTCH, ESPECIALLY FOR CHANGE GEAR TRANSMISSIONS

Anton Zittrell and Georg Wimmer, Friedrichshafen, Germany

Application March 22, 1957, Serial No. 647,889

Claims priority, application Germany May 2, 1956

2 Claims. (Cl. 192—67)

This invention relates to gear transmissions and more particularly to a shifting sleeve for such transmissions for positive drive between a driving shaft and either of two gears rotatively mounted on the shaft.

It is an object of the invention to provide a gear shift mechanism of simple and rugged construction.

It is another object of the invention to provide a shifting collar or sleeve capable of reciprocating for positive mesh between two gears and having stop means to limit the motion of the sleeve in either direction.

Briefly, my invention in a preferred form comprises a toothed clutch sleeve devised with a pair of shoulder abutments cut into each tooth wherein the abutments are arranged to alternately engage the respective sides of coacting toothed clutch rings with which the teeth of the sleeve meshes. Thus, the sleeve, being formed with an annulus of internal teeth, can mesh with the external teeth of a clutch ring disposed on each side of the sleeve and spaced therefrom, the recessed shoulders being engageable with a respective ring as a limit stop for the axial motion of the sleeve. The recesses are of an axial length equal to the axial length of the teeth of the rings, and accordingly, the sleeve is limited in its motion in either axial direction to an extent equal to the width of the ring teeth.

In general, the above construction simplifies prior mechanisms wherein various elements such as stop disks were required to limit the motion of the shifting sleeve in either direction. Such prior constructions were complicated and required multi-part construction of the rings and gears which were associated with respective rings. By the use of the present invention such rings may be made integrally with their associated gears that are part of the transmission mechanism.

A detailed description of my invention will now be given in conjunction with the appended drawing in which Figure 1 is a cross section in elevation of the invention, Figure 2 is an amplified fragment of certain elements of Figure 1 and Figure 3 is a fragment of a modification.

Referring now to Figures 1 and 2, the invention comprises a driving shaft 1 having a splined element 2 which carries an axially movable shifting sleeve 3. The sleeve 3 is provided with teeth 3' in the manner of a gear on its outer periphery and carries slidably a shifting collar 5 which can reciprocate axially by actuation of fork 5'. Collar 5 has an annular set of internal teeth 4 which are recessed inwardly of each end. Each tooth has a recess 14 along its crest at each end, having a radial depth S so as to leave an internal shoulder 15. Thus, as clearly seen on Figure 2 the tooth 4 has its top surface cut away at both ends providing the recesses 14 and respective shoulders 15 wherein the axial depth S of the recess is predetermined so as to leave sufficient material for the shoulder 15 to serve as a suitable abutment. Collar 5 is shifted so as to engage the teeth 4 with the teeth of a clutch ring 8 of a counter gear 6, or the teeth of a clutch ring 9 of gear 7. Gears 6 and 7 drive gears 11 and 12, respectively, as will be understood, in a gear transmission.

The height of the clutch teeth 8 and 9 is equal to the height of the teeth 4 less the radial distance S so that, as will be apparent, collar 5 will abut at a plurality of surfaces, equal to the number of clutch teeth in the collar, against the sides of the clutch rings 8 or 9. Accordingly, the collar 5 can be shifted only to a distance determined by the axial lengths of recesses 14 and thus the extreme path of travel of the collar is kept within predetermined limits so that it will not interfere with any of the other mechanisms or gears in the transmission.

Attention is now invited to Figure 3 showing a modification of the above form of the invention to the extent that instead of removing a portion of the material of the teeth of the shifting sleeve, the gullies between the teeth are recessed to form shoulders 20 having an axial depth S, as shown. Thus, either clutch ring, such as 22, would engage a plurality of shoulders 20 to limit motion of the shifting collar. In this instance, it will, of course, be appreciated that the height of the clutch teeth of the rings is in excess of the height of the clutch teeth 24 of the shifting sleeve by an amount equal to S as shown.

Having thus described my invention I am aware that various changes may be made without departing from the spirit thereof and accordingly, I do not seek to be limited to the precise illustration herein given except as set forth in the appended claims.

We claim:

1. In a device of the class described, a shift sleeve element having clutch teeth, a clutch ring element having teeth engageable by the teeth of said shift sleeve element, said elements having relative axial motion to effect said engagement, one of said elements having shoulder means engageable with the other of said elements, said shoulder means being disposed at a predetermined axial distance from a radial edge of said one element, wherein engagement of said shoulder means with said other element limits the relative axial motion of said elements, said shoulder means comprising the walls of recesses in the clutch teeth of said shift sleeve element, said shoulder means comprising recesses formed in the gullies intermediate the teeth of one of said elements.

2. In a device of the class described, a rotary shaft, hub means secured to said shaft, said hub means being provided with peripheral teeth extending radially therefrom, an axially shiftable clutch element carried on said hub means and having teeth intermeshing with the teeth on said hub means and slidable axially with respect thereto, a collar mounted on said shaft and provided with peripheral teeth engageable by the teeth of said shiftable element, said shiftable element and said collar having means comprising surfaces engageable with each other to serve as a limit stop for predetermining the extent of axial travel of said shiftable element, said surfaces comprising shoulders carried by said shiftable element and effected by radial recessing of the gullies between the teeth thereof, said teeth having means to engage said shoulders wherein the teeth of said collar have a radial dimension of sufficient length to effect such engagement.

References Cited in the file of this patent

UNITED STATES PATENTS

| | | |
|---|---|---|
| 1,813,770 | Robertson | July 7, 1931 |
| 1,935,965 | Wahlberg | Nov. 21, 1933 |
| 2,220,463 | Sinclair | Nov. 5, 1940 |
| 2,291,851 | Wahlberg et al. | Aug. 4, 1942 |

FOREIGN PATENTS

| | | |
|---|---|---|
| 142,032 | Great Britain | Oct. 24, 1919 |